UNITED STATES PATENT OFFICE.

ALBERT H. WRIGHT, OF CAMDEN, NEW JERSEY.

COMPOSITION OF MATTER FOR ORNAMENTAL PURPOSES.

Specification forming part of Letters Patent No. 25,074, dated August 9, 1859.

*To all whom it may concern:*

Be it known that I, ALBERT H. WRIGHT, of Camden, in the county of Camden and State of New Jersey, have invented a new and useful Composition of Matter for Ornamental and other Purposes; and I do hereby declare that the following is a full and exact description of the same.

The nature of my invention consists in the combination of clay and sulphur with emery or any other similarly hard or suitable substance or substances, substantially as hereinafter described, so as to produce a composition of matter capable of being colored, formed, and finished to resemble lava ornaments for jewelry, vases, statuettes, and other ornamental or useful articles.

To enable others to understand and practice my invention, I will proceed to enumerate the materials used, and to describe the manner in which I combine them together, and also produce therefrom artificial-lava ornaments for jewelry.

I take about two parts (by measure) of dry pulverized clay, one part of the flowers of sulphur, and one part of flour of emery, and mix them intimately together with enough pure water to produce a dense plastic mass of about the consistency of glaziers' putty. I then put this mass into a mold adapted to give it the contour desired and apply sufficient pressure to make it conform thereto accurately. I then remove it from the mold and expose it to a very gentle heat, so as to dry it slowly and perfectly without fusing the sulphur, and then lay it upon a piece of slate or other suitable support and gradually increase the heat thereof, by means of a spirit-lamp or otherwise, sufficiently to fuse the sulphur, when, keeping it at about the same heat, I take a brush or other suitable implement and, dipping it into sulphur kept in a state of complete fusion in a suitable vessel, thoroughly saturate the said composition therewith, turning it about so as to apply the said melted sulphur to every part. I now let it cool gradually on the plate, after which it is ready for use or application. The operation of saturating a single article for jewelry purposes generally occupies only a few minutes.

In the manufacture of this composition of matter the purest clay is the best for the purpose; but the common potter's clay will answer very well. I generally use the washed flowers of sulphur and the floured emery, because each of the said constituents should be pure, and must also be brought into a very finely pulverized state before they are incorporated, together with the clay, into the mass described.

In place of the emery, either finely-pulverized quartz, silex, glass, or other similarly-hard substances may be used; but I find the floured emery to answer the purpose best, which is to give greater hardness to the composition.

The composition described may be colored (while in the soft mass or powder) to almost any required tint by adding a little finely-pulverized vermilion, Prussian blue, chrome-yellow, or other suitable coloring-matter.

Vases, statuettes, and other similar ornamental or useful articles may be as readily produced of this composition in the manner described for producing ornaments for jewelry, and so as to be, like them, scarcely distinguishable from those cut from real lava, while the former will be equally hard and durable.

Having thus fully described my new composition of matter and shown its constituents, and also pointed out the manner in which I produce ornamental articles for jewelry, &c., of the same, what I claim as new therein of my invention, and desire to secure by Letters Patent, is—

The composition of matter described, the same consisting of the clay and sulphur with the emery or its substitute combined together, substantially as and for the purposes described.

A. H. WRIGHT.

Witnesses:
B. F. SHUTTUCK,
JAS. P. DIX.